G. W. UNDERWOOD.
GRAIN COLLECTOR.
APPLICATION FILED MAY 29, 1916.
1,224,871.
Patented May 1, 1917.
2 SHEETS—SHEET 2.
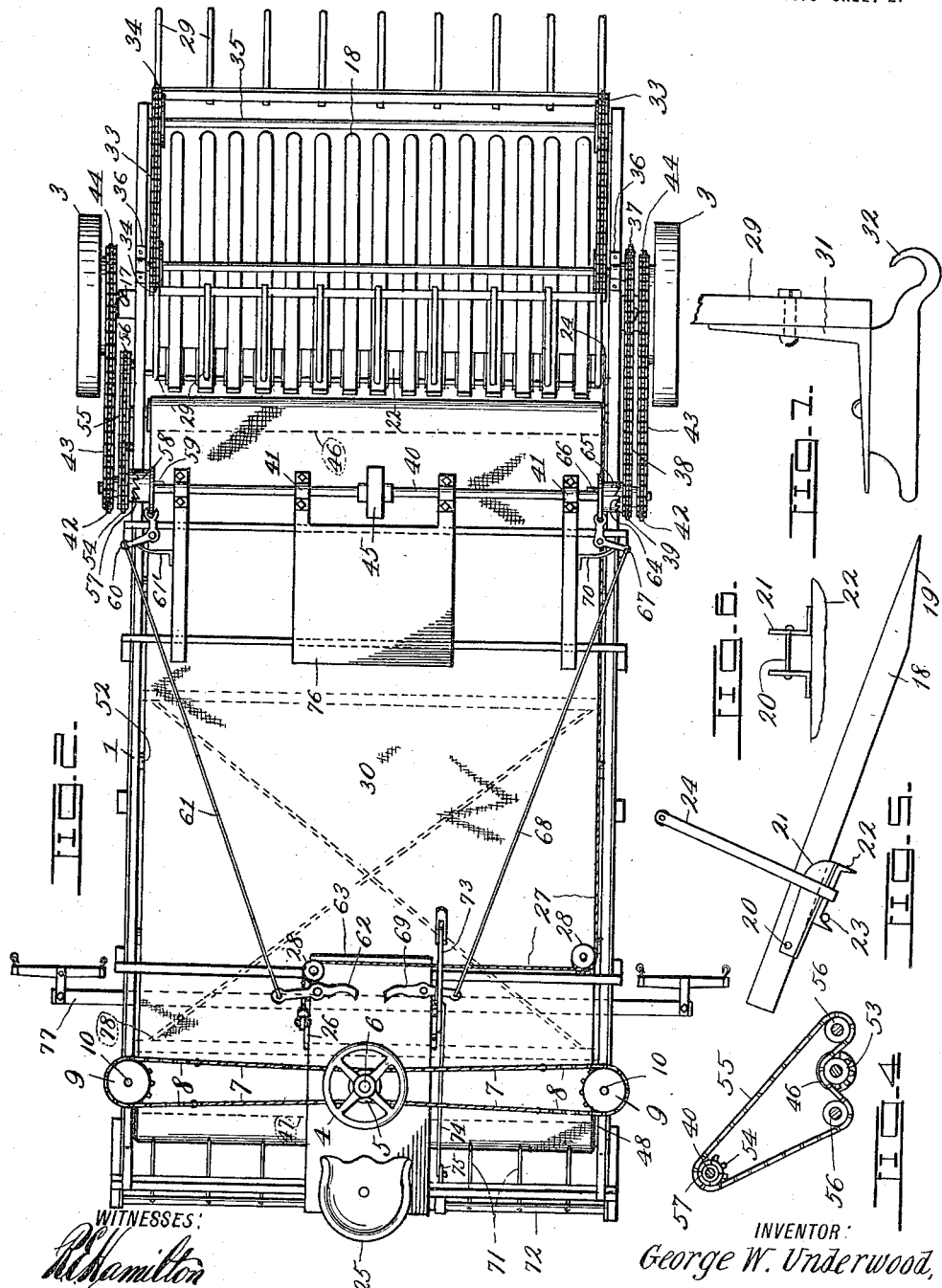
WITNESSES:
R. Hamilton
Fred C. Fischer.
INVENTOR:
George W. Underwood,
BY
F. G. Fischer,
ATTORNEY.

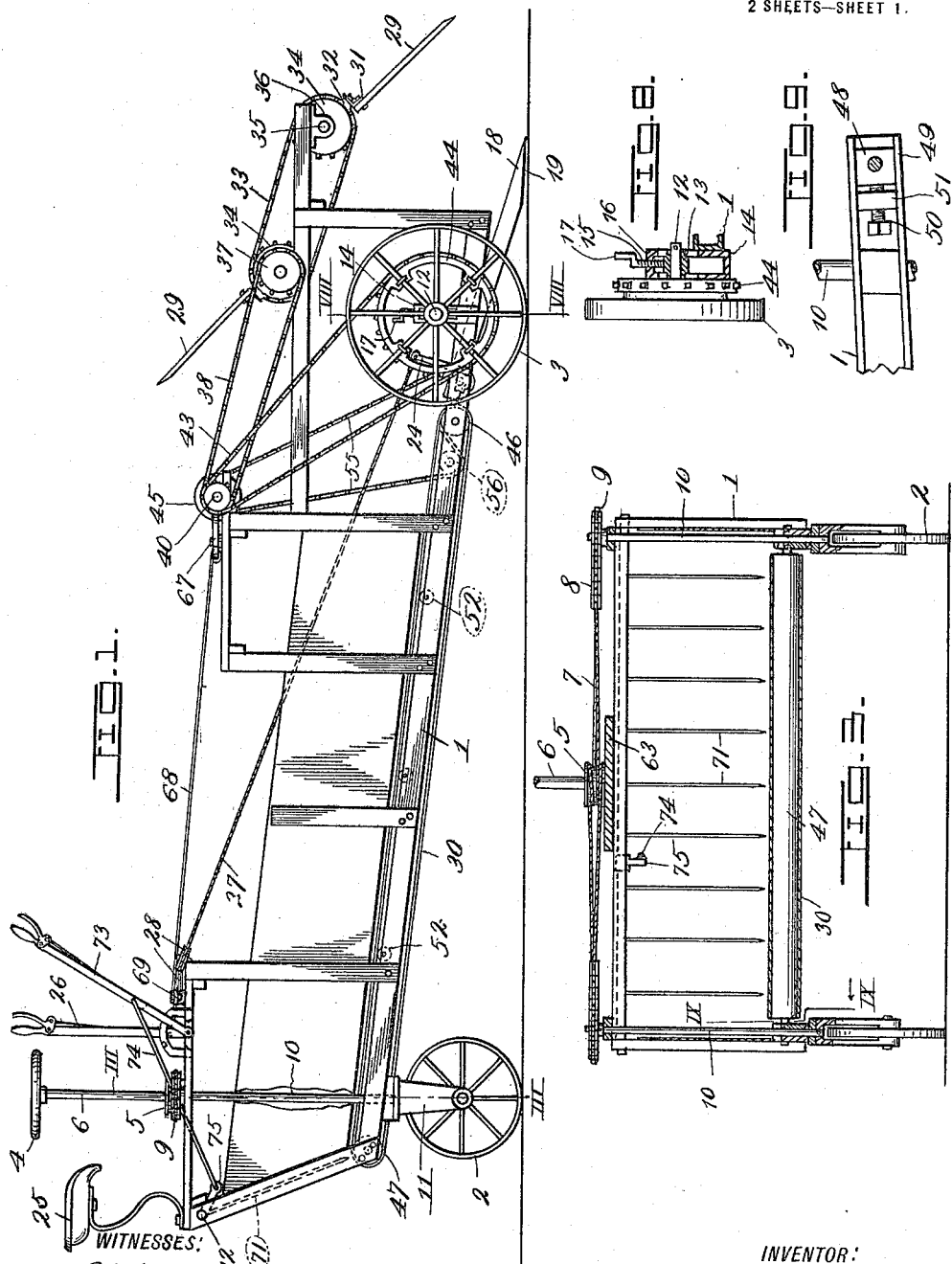

UNITED STATES PATENT OFFICE.

GEORGE W. UNDERWOOD, OF ORIENTA, OKLAHOMA, ASSIGNOR OF ONE-HALF TO FRANK E. NICHOLSON, OF ORIENTA, OKLAHOMA.

GRAIN-COLLECTOR.

1,224,871.  Specification of Letters Patent.  Patented May 1, 1917.

Application filed May 29, 1916. Serial No. 100,596.

*To all whom it may concern:*

Be it known that I, GEORGE W. UNDERWOOD, a citizen of the United States, residing at Orienta, in the county of Major and State of Oklahoma, have invented certain new and useful Improvements in Grain-Collectors, of which the following is a specification.

This invention relates to improvements in grain collectors, and one object is to provide a new and useful machine whereby either loose grain, or grain in shocks or bundles, may be gathered without loss from a field and carried to any desired point, such, for instance, as a stack, a thresher, etc.

A further object is to provide a machine of large capacity, which is comparatively simple in construction and operation, which may be readily controlled, and is not liable to get out of order.

Other objects will hereinafter appear, and in order that said invention may be fully understood, reference will now be made to the accompanying drawings, in which:

Figure 1 is a side elevation of a machine built in accordance with the invention.

Fig. 2 is a plan view of the machine.

Fig. 3 is a broken transverse section on line III—III of Fig. 1.

Fig. 4 is a detail side elevation, partly in section, of certain sprocket transmission gearing employed in carrying out the invention.

Fig. 5 is a detail side elevation of a gathering fork and its mountings, which constitutes an important feature of the invention.

Fig. 6 is a detail front elevation of some of the parts disclosed by Fig. 5.

Fig. 7 is a broken detail side elevation, enlarged, of a conveyer fork and its mountings.

Fig. 8 is an elevation, partly in section, of means for adjusting the forward end of the machine up and down.

Fig. 9 is a broken side elevation of a tensioning device employed in carrying out the invention.

In carrying out the invention, I employ a frame 1, the main sills of which slope downwardly and forwardly as disclosed by Fig. 1. The rear portion of the frame 1 is mounted upon a pair of guide wheels 2, while its forward portion is mounted upon a pair of tractor wheels 3. The guide wheels 2 are controlled by the operator through the intermediacy of a steering wheel 4, a drum 5, a steering rod 6 upon which the steering wheel 4 and the drum 5 are fixedly mounted, cables 7 wound around the drum 5, sprocket chains 8 attached to the ends of the respective cables 7, sprocket wheels 9 around which the respective chains 8 operate, and vertical shafts 10 secured at their lower ends to the forks 11 of the guide wheels 2, and having the respective sprocket wheels 9 fixed to their upper terminals.

The tractor wheels 3 are mounted upon stub axles 12, which in turn are mounted in bearings 13 vertically adjustable in standards 14, fixed to the forward portions of the sills of the frame 1, so that the forward end of said frame may be adjusted toward and away from the ground as desired. The up and down adjustment of the forward end of the frame is accomplished by screws 15 bearing at their lower ends upon the bearings 13 and extending through the threaded upper ends 16 of the standards 14. The upper ends of the screws 15 are bent to form crank handles 17, whereby they may be rotated to effect vertical adjustment of the frame 1 as abovementioned.

18 designates a series of gathering forks adapted to pick up shocks or bundles of grain from the ground. Said forks 18 are also adapted to pick up loose grain or broken bundles from the ground. The under front ends 19 of the forks 18 are beveled, so that they may pass beneath the grain and lift it gently from the ground without shaking the kernels of the grain loose from the straw or stalks. The forks 18 have limited independent movement, so that each may pass over slight obstructions on the ground without lifting its companions. This is effected by pivotally-mounting each fork at its rear end upon a pin 20, supported by a pair of brackets 21, between which the fork loosely extends.

The forks 18 are simultaneously raised and lowered by a transverse bar 22, preferably, of channel bar construction by reason of the greater strength and rigidity afforded, said bar extending beneath the brackets 21 which are fixedly-mounted thereon. Pivots 23 are fixed on the opposite ends of the bar 22 and journaled in the sills of the frame 1, so that said bar may freely rock to raise and lower the points of the forks 18. The bar 22 is controlled by a fixedly-mounted arm 24, adapted to be actuated from the driver's seat 25 at the rear upper portion of the frame 1, through the intermediacy of a hand lever 26 and a cable 27 connecting said hand lever 26 to the arm 24. Guide sheaves 28 at the upper rear portion of the frame 1 are provided to direct the cable 27 from the arm 24 to the lever 26.

29 designates two series of conveyer forks for coacting with the force 18 in conducting the grain backward to an endless conveyer 30. Each series of conveyer forks 29 is rigidly mounted upon a transverse angle bar 31, secured at its ends upon a pair of links 32 constituting parts of a pair of endless sprocket chains 33, which run around two pairs of sprocket wheels 34, mounted upon shafts 35, journaled in bearings 36 on the upper forward portion of the frame 1.

The rearmost shaft 35 is provided with a sprocket wheel 37, driven by an endless sprocket chain 38 from a sprocket wheel 39 loosely-mounted upon a shaft 40, journaled in bearings 41 on the upper intermediate portion of the frame 1. Said shaft 40 is provided at its ends with a pair of fixedly-mounted sprocket wheels 42, driven by endless sprocket chains 43 from a pair of large sprocket wheels 44, fixed to the tractor wheels 3. Through the intermediacy of the aforementioned sprocket gearing the conveyer forks 29 travel at approximately the same speed as the tractor wheels 3, and consequently do not violently contact the bundles and shake the grain therefrom upon the ground.

The shaft 40 is provided intermediate its ends with a suitable differential 45, to compensate for the differences in speed between the two tractor wheels 3 that will occur from time to time during the operation of the machine.

The endless conveyer 30 travels around front and rear rollers 46 and 47, respectively, the former being arranged at the rear of the forks 18 and journaled in the sills of the frame 1, while the roller 47 is journaled in adjustable boxes 48, so that said roller 47 may be adjusted in parallel relation to the roller 46 and also adjusted backwardly to tension the endless conveyer 30, which consists, preferably, of canvas detachably connected at its ends, so that it may be removed from the rollers 46 and 47, when desired. As disclosed by Fig. 9, the boxes 48 are slidably mounted at 49 on the rear portions of the frame sills. Screws 50 threaded through lugs 51 on the frame 1, bear against the forward ends of the boxes 48. By rotating said screws 50 in the proper direction the boxes 48 are forced backward and tension the conveyer 30 accordingly. The upper portion of the conveyer 30 is supported intermediate the rollers 46 and 47 by a plurality of idler rollers 52 journaled in the sills of the frame 1. Motion is transmitted to the conveyer 30 through a sprocket wheel 53 fixed to one end of the roller 46, a sprocket wheel 54 loosely mounted upon the shaft 40, and an endless sprocket chain 55 extending over the sprocket wheel 53 and engaging the sprocket wheel 54. Idlers 56 are provided to hold the chain 55 in engagement with the sprocket wheel 53.

The sprocket wheel 54 has a clutch member 57, adapted to engage a companion clutch member 58 slidable upon the shaft 40, but made to rotate therewith by suitable means such as a feather 59. The clutch member is normally held out of engagement with the clutch member 57 through the intermediacy of a bell-crank 60 and a spring 60', both of which are mounted upon the upper intermediate portion of the frame 1. When it is desired to operate the conveyer 30, the clutch member 58 is manually thrown into engagement with the clutch member 57 through the intermediacy of the bell-crank 0, a rod 61, and a foot lever 62, which latter is fulcrumed upon a platform supporting the driver's seat 25.

The conveyer forks 29 may be stopped when the machine is going to, or from a field, or at such other times as desired, through a clutch mechanism similar to that for controlling the operation of the conveyer 30, and comprising a clutch member 64 carried by the sprocket wheel 39, a companion clutch member 65 slidable upon said shaft 40, but made to rotate therewith by a feather 66, a bell-crank 67, for moving said clutch member 65 into and out of engagement with the clutch member 64, a rod 68, and a foot lever 69 fulcrumed adjacent the foot lever 62. A spring 70 bearing against the bell-crank 67, tends to cause the same to throw the clutch member 65 out of engagement with the clutch member 64.

As the grain is carried back upon the conveyer 30, it is stopped by a gate 71, the upper bar 72 of which is pivoted in the upper rear portion of the frame 1 to allow said gate to swing backward to open position, so that the grain may be discharged without stopping the machine. The gate 71 is manually controlled by a hand lever 73, connected by a rod 74 to a crank arm 75, fixed to the intermediate upper portion of the gate. The usual latch and segment are employed for holding the lever 73 in any of its adjusted positions.

When the machine is to be motor driven a suitable engine is mounted upon a platform 76 adjacent the shaft 40, to which said motor may be geared as desired.

When the machine is to be drawn by horses a draft equalizer 77 is, preferably, employed and suitably connected to a trussed spreader 78, adapted to be secured to the underside of the frame 1.

The operation of the machine briefly stated is as follows: When in the field the gathering forks 18 are lowered into proper relation with the surface of the ground by manipulating the lever 26 and the conveyer forks 29 are set in motion by proper manipulation of the foot lever 69, so that said conveyer forks will move the grain backward upon the forks 18 until it is disposed upon the forward end of the conveyer 30. The latter is then thrown into operation to carry the grain back against the gate 74, through proper manipulation of the foot lever 62, after which the conveyer 30 is stopped until more grain is deposited upon its forward end, when it is again thrown into gear to carry the grain backward. The foregoing operations continue until the machine is loaded with grain, whereupon the conveyer forks 29 and the endless conveyer 30 are thrown out of gear and the machine is driven to any desired point to deposit the grain, which is accomplished without stopping the machine by opening the gate 71 and throwing the conveyer 30 into gear.

From the foregoing description, it is apparent that I have produced a grain collector whereby large loads of grain may be quickly gathered without loss and carried to any point of a field, and while I have shown and described the preferred form of my invention, I reserve the right to make such changes in the construction, operation, and arrangement of parts as properly fall within the spirit and scope of the claims.

Having thus described my invention, what I claim and desire to secure by Letters Patent, is:

1. In a grain collector, a frame having spaced sills, a flat rockable bar having end journals in the sills, a plurality of pairs of brackets fixed on the bar each bracket consisting of a base flange secured to the bar and an upturned arm extending rearwardly beyond the bar in parallel relation with the corresponding arm of the companion bracket, a pivot pin connecting the rear end portions of the bracket arms, and a fork pivoted on each pin and resting on the bar.

2. In combination with the frame of a grain collector, a rockable bar having a flat upper face and pivoted to the frame for permitting its forward side to swing vertically, a plurality of forks supported by the flat face of the bar, means fixed to the bar and pivotally mounting each fork in rear of the pivotal mounting of the bar for independent movement, and means for rocking the bar to raise and lower the forks in unison.

In testimony whereof I affix my signature in the presence of two witnesses.

GEORGE W. UNDERWOOD.

Witnesses:
O. D. WINDHAM,
WALTER T. JONES.